United States Patent
Kwon et al.

(10) Patent No.: US 9,827,922 B2
(45) Date of Patent: Nov. 28, 2017

(54) HEADLINING HAVING HEAT SHIELDING FUNCTION FOR VEHICLE AND MANUFACTURING METHOD THEREOF

(71) Applicant: DAEHAN SOLUTION CO., LTD, Incheon (KR)

(72) Inventors: Choong Ho Kwon, Seoul (KR); Jang Seok Park, Incheon (KR)

(73) Assignee: DAEHAN SOLUTIONS CO., LTD, Incheon (KR)

( * ) Notice: Subject to any disclaimer, the term of this patent is extended or adjusted under 35 U.S.C. 154(b) by 0 days.

(21) Appl. No.: 14/840,766

(22) Filed: Aug. 31, 2015

(65) Prior Publication Data

US 2016/0107586 A1    Apr. 21, 2016

(30) Foreign Application Priority Data

Oct. 17, 2014  (KR) ........................ 10-2014-0140517

(51) Int. Cl.
*B62D 25/06* (2006.01)
*B60R 13/02* (2006.01)

(52) U.S. Cl.
CPC ................ *B60R 13/0212* (2013.01)

(58) Field of Classification Search
CPC .................... B62D 25/06; B60R 13/0815
USPC ......................................................... 296/211
See application file for complete search history.

(56) References Cited

U.S. PATENT DOCUMENTS 4,663,230 A * 5/1987 Tennent ............... B01J 35/06
427/216
6,368,702 B1 * 4/2002 Erickson ............... B29C 43/203
428/292.1
2002/0177645 A1 * 11/2002 Mosher ...................... C09J 9/02
524/428
2003/0213939 A1 * 11/2003 Narayan ................ B82Y 10/00
252/500
2007/0172642 A1 * 7/2007 Fukatani ........... B32B 17/10174
428/323

(Continued)

FOREIGN PATENT DOCUMENTS

CN    103441171 A   * 12/2013
CN    103441171 B   *  5/2016

(Continued)

OTHER PUBLICATIONS

"Substrate" definition from bing online internet search, May 2, 2017. http://www.bing.com/search?q=define%3A+substrate&src=IE-SearchBox&FORM=IESR02.*

*Primary Examiner* — H Gutman
(74) *Attorney, Agent, or Firm* — Nixon & Vanderhye P.C.

(57) ABSTRACT

A headlining having a heat shielding function for a vehicle and a manufacturing method for producing the headlining, in which a heat shielding layer having a heat shielding effect is stacked on a polyurethane foam sheet as a substrate having an excellent insulating effect and integrally formed therewith to prevent heat from being transferred to an inside of the vehicle through a roof panel occupying a wide portion exposed to an outside of the vehicle. In so doing, it is possible to create comfortable indoor environment of the vehicle even in hot summertime, to restrict an increase in an internal temperature of the vehicle and thus to reduce an operation time of an air conditioner and to enhance fuel efficiency of the vehicle.

7 Claims, 6 Drawing Sheets

(56) References Cited

U.S. PATENT DOCUMENTS

| | | | | |
|---|---|---|---|---|
| 2011/0159236 | A1* | 6/2011 | Nakae | B32B 3/266 428/138 |
| 2012/0094067 | A1* | 4/2012 | Nakae | B32B 5/22 428/138 |
| 2012/0302698 | A1* | 11/2012 | Dorn | E04D 12/002 524/606 |
| 2013/0200292 | A1* | 8/2013 | Fung | C03C 17/007 252/62 |
| 2013/0260139 | A1* | 10/2013 | Kamada | C03C 17/007 428/328 |
| 2014/0011414 | A1* | 1/2014 | Kruckenberg | B32B 5/16 442/181 |
| 2014/0320956 | A1* | 10/2014 | Taka | G02B 1/11 359/359 |
| 2015/0002928 | A1* | 1/2015 | Kiyoto | G02B 5/206 359/360 |
| 2015/0043058 | A1* | 2/2015 | Saito | B32B 7/02 359/359 |
| 2015/0132499 | A1* | 5/2015 | Kimura | B05D 1/34 427/402 |
| 2015/0330025 | A1* | 11/2015 | Luna Marroquin | D21H 17/11 162/158 |
| 2015/0362627 | A1* | 12/2015 | Yang | G02B 1/04 252/587 |

FOREIGN PATENT DOCUMENTS

| | | | | | |
|---|---|---|---|---|---|
| FR | WO 2009018218 | A1 * | 2/2009 | | B29C 43/203 |
| FR | DE 102010054110 | A1 * | 6/2011 | | E04D 12/002 |
| KR | 0188709 | B1 | 7/2000 | | |
| KR | 1192416 | B1 | 10/2012 | | |
| KR | 1227628 | A | 1/2013 | | |

* cited by examiner

HEADLINING HAVING HEAT SHIELDING FUNCTION FOR VEHICLE AND MANUFACTURING METHOD THEREOF

CROSS-REFERENCE TO RELATED APPLICATION

This application claims priority to and the benefit of Korean Patent Application No. 10-2014-0140517, filed on Oct. 17, 2014, the disclosure of which is incorporated herein by reference in its entirety.

FIELD OF THE INVENTION

The present invention relates to a headlining having a heat shielding function for a vehicle and a manufacturing method thereof, and more particularly, to a headlining having a heat shielding function for a vehicle, in which a heat shielding layer including a hot melt film for heat-shield is stacked on a polyurethane substrate having heat shielding performance, and thus it is possible to create a comfortable indoor environment of the vehicle through a heat shielding effect even in hot summertime, to reduce an operation time of an air conditioner and thus to enhance fuel efficiency of the vehicle, and also it is possible to further increase the heat shielding effect and the fuel efficiency, compared with a weight of the heat shielding layer, and a manufacturing method thereof.

BACKGROUND OF THE INVENTION

Generally, in a roof panel of a vehicle, as illustrated in FIG. 1, a headlining (L) is installed at an indoor side thereof to provide a buffer function, mood or the like, as illustrated in FIG. 2. The headlining (L) is fixed to a side roof rail by a clip, and formed of various materials such as vinyl and cotton, and serves as an insulating material against a temperature change from an outside. The headlining (L) is manufactured by various methods and of various materials, as described in the following patent documents 1 to 3.

The patent document 1 discloses a manufacturing method of the headlining, which is capable of strengthening an adhesive force of each layer of an acoustic head lining, while simplifying a manufacturing process thereof, and improving reliability of a product, and also preventing a thermal deformation of polyurethane foam, and thus providing excellent acoustic absorption performance.

The patent document 2 discloses a material of a headlining for a vehicle, which includes a first layer including natural fiber, polypropylene and polyethylene terephthalate, a second layer including thermoplastic (TF) foam, and a third layer including the natural fiber, the polypropylene and the polyethylene terephthalate, and is capable of realizing high acoustic absorption performance, environment friendliness and a light weight, and a manufacturing method thereof.

The patent document 3 discloses a manufacturing method of the headlining, which is capable of providing an excellent adhesive force by using adhesive powder having a graft polymer property, being manufactured in a simple process without using an adhesive film, compared with a conventional manufacturing method using the adhesive film and adhesive powder, reducing a manufacturing cost, improving inconvenience in using the adhesive film, and also providing an acoustic absorption effect in the vehicle by forming a permeable adhesive layer. However, the conventional headlining has the following problems:

(1) In the middle of summer, when the vehicle is parked at a shadeless place for a long period of time, an internal temperature of the vehicle is increased. Therefore, to prevent the internal temperature from being increased, a window of the vehicle may be slightly opened, but in this case, it is apprehended that the vehicle or an article therein may be stolen.

(2) Such an increase in the internal temperature is caused by heat transfer through glass (door glass, front glass and rear glass) and a roof panel. To solve this problem, the glass is tinted or coated with a light protection film, and thus the increase in the internal temperature is prevented.

(3) However, since the heat is transferred through not only the glass but also the roof panel which occupies most of a ceiling of the vehicle, a high-priced heat shielding material may be used to prevent the heat transfer. This causes a high manufacturing cost and also causes the fuel efficiency of the vehicle to be lowered.

(4) Meanwhile, when the internal temperature of the vehicle is increased, a child or the old and the infirm may suffer from heat exhaustion or heatstroke, and a lighter or a canned drink may be exploded by thermal expansion and thus may contaminate the vehicle or may cause a fire.

(5) Therefore, in the case of the roof panel exposed to direct sunlight during the summertime, a temperature thereof is very high, and thus it is necessary to prevent the heat from being transferred to the inside of the vehicle through the roof panel, and thus to prevent a safety accident.

PRIOR ART DOCUMENTS

Patent Documents (Patent document 1) Korean U.M. Registration No. 0188709
  (Registration date: Apr. 29, 2000)
(Patent document 2) Korean U.M. Registration No. 1192416
  (Registration date: Oct. 11, 2012)
(Patent document 3) Korean U.M. Registration No. 1227628
  (Registration date: Jan. 23, 2013)

SUMMARY OF THE INVENTION

The present invention is directed to a headlining having a heat shielding function for a vehicle, in which a heat shielding layer having a heat shielding effect is stacked on a polyurethane foam sheet as a substrate having an excellent insulating effect and integrally formed therewith to prevent heat from being transferred to an inside of the vehicle through a roof panel occupying a wide portion exposed to an outside of the vehicle, and thus it is possible to create comfortable indoor environment of the vehicle even in hot summertime, to restrict an increase in an internal temperature of the vehicle and thus to reduce an operation time of an air conditioner and to enhance fuel efficiency of the vehicle, and a manufacturing method thereof.

Also, the present invention is directed to a headlining having a heat shielding function for a vehicle, in which a hot melt film is coated with a heat shielding material to substantially provide the heat shielding effect, and thus it is possible to minimize a total weight of the vehicle while increasing the effect of shielding the heat transferred through the roof panel, and thus to expect the heat shielding effect and the fuel efficiency enhancing effect, and a manufacturing method thereof.

Also, the present invention is directed to a headlining having a heat shielding function for a vehicle, in which carbon nanotubes (CNT) having a light weight as the heat shielding material are used to minimize an increase of a weight thereof and also to enhance the heat shielding effect, and a manufacturing method thereof.

According to an aspect of the present invention, there is provided a manufacturing method of a headlining having a heat shielding function, including a first operation of manufacturing a hard polyurethane foam sheet 100; a second operation of stacking in turn and laminating a glass mat 210, a hot melt film 220 and a non-woven fabric 230 on at least one surface of the polyurethane foam sheet 100; a third operation of thermoforming the laminated polyurethane foam sheet 100 and obtaining a heat shielding substrate 300; and a fourth operation of installing an outer material 400 on a surface of the heat shielding substrate 300 exposed to an inside of the vehicle.

The polyurethane foam sheet 100 may be formed by foaming polyol and isocyanate at a low pressure and a liquid ratio of 100/150 to 180 (polyol/isocyanate), and reactivity thereof may have a cream time (CT) of 60 to 80 seconds, a rise time (RT) of 270 to 300 seconds, and a demolding time (DT) of 30 to 50 minutes. And the polyurethane foam sheet (100) may have a density of 20 to 35 kg/m$^3$ and a thickness of 7 to 10 t.

The hot melt film 220 may be formed by coating a heat shielding material having a thickness of 1 to 20 μm on a film having a multilayered structure including at least one of polyolefin, TPE, EVA, PET and polyamide having a thickness of 30 to 50 μm, and then heat-drying them, and may have a heat shielding rate of 50 to 90% with respect to a sunlight infrared range of 800 to 2,200 nm. At this time, the heat shielding material may have a composition including a modified polyacrylic resin of 5.0 to 10.0 weight %, carbon nanotube of 9.9 to 20.0 weight %, alcohol of 65.0 to 85.0 weight % and an additive of 0.1 to 5.0 weight %. Also, the carbon nanotube may be multi-wall carbon nanotube having a diameter of 20 to 30 nm and a length of 25 to 35 μm.

In the third operation, a thermoforming process may be performed by pressing them at 130 to 150° C. for 40 to 70 seconds using a thermoforming mold (M).

The outer material 400 may be formed of non-woven fabric, suede or cloth.

According to another aspect of the present invention, there is provided a headlining for a vehicle manufactured by the manufacturing method of a headlining for a vehicle, which has the heat shielding function described above.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

[Detailed Description of Main Elements]

| | |
|---|---|
| 100: polyurethane foam sheet | 210: glass mat |
| 220: hot melt film | 230: non-woven fabric |
| 300: heat shielding substrate | 400: outer material |

DETAILED DESCRIPTION OF VARIOUS EMBODIMENTS OF THE INVENTION

Hereinafter, exemplary embodiments of the present invention will be described in detail below with reference to the accompanying drawings. It should be understood that the terms used in the specification and the appended claims should not be construed as limited to general and dictionary meanings, but should be interpreted based on the meanings and concepts corresponding to technical aspects of the present invention on the basis of the principle that the inventor is allowed to define terms appropriately for the best explanation.

Therefore, the description proposed herein is just a preferable example for the purpose of illustrations only, not intended to limit the scope of the invention, so it should be understood that other equivalents and modifications could be made thereto without departing from the spirit and scope of the invention.

(Manufacturing Method)

As illustrated in FIGS. 3A, 3B, 3C, 3D and 3E, a manufacturing method of a headlining according to the present invention includes four operations. Hereinafter, each of the four operations will be described.

Figure 1:
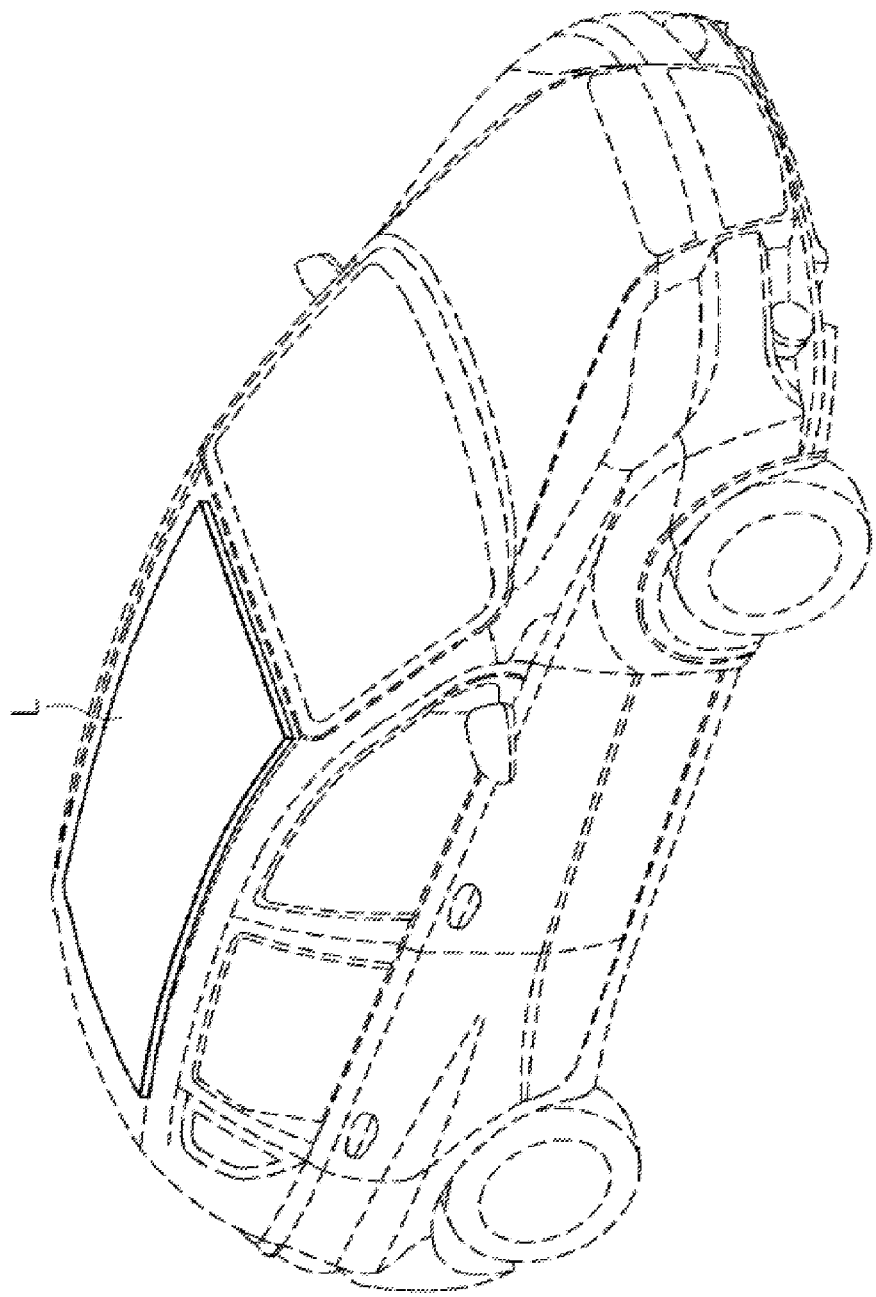
FIG. 1 is a perspective view of a vehicle illustrating an installation position of a headlining.
Figure 2:
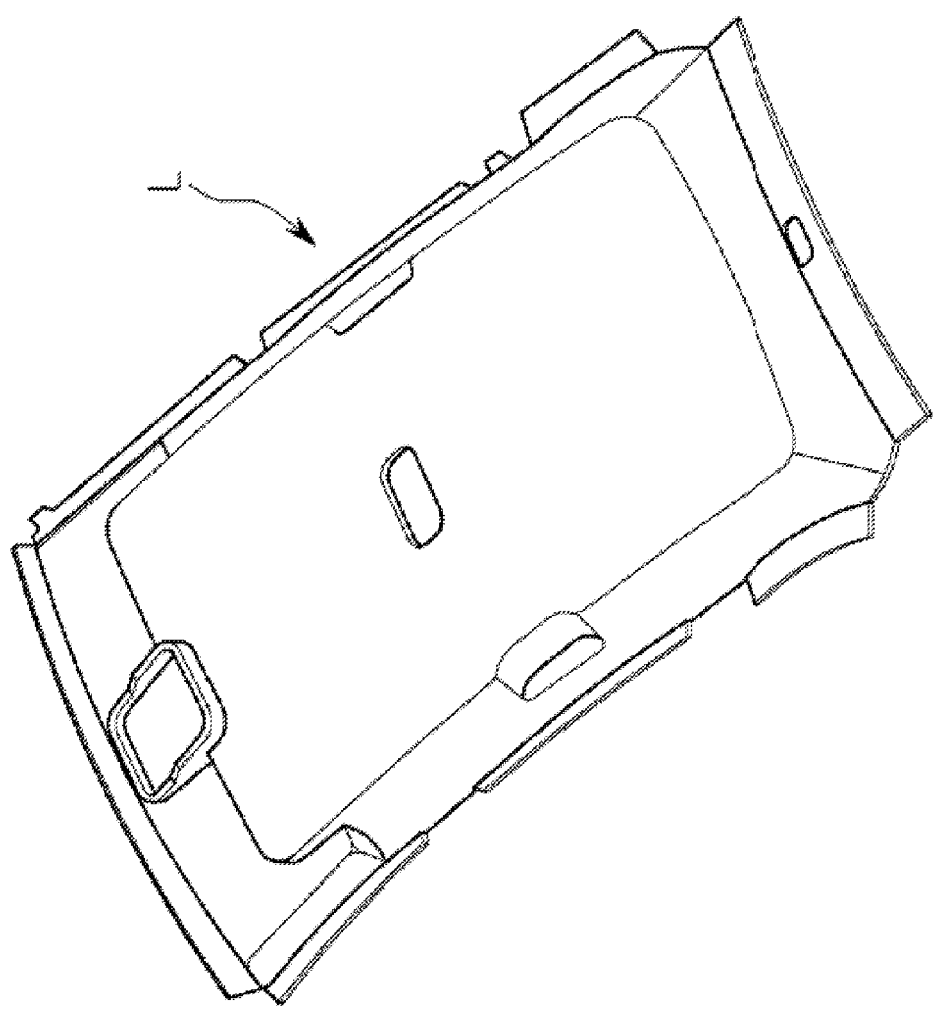
FIG. 2 is a perspective view illustrating a whole shape of a general headlining.
Figure 3A:
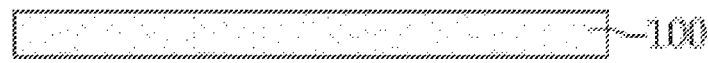
FIGS. 3A, 3B, 3C, 3D and 3E are views illustrating a manufacturing process to explain a manufacturing method of a headlining according to the present invention.

As illustrated in FIG. 3A, a first operation is an operation for manufacturing a hard polyurethane foam sheet 100. At this time, any sheet may be used, as long as the sheet is formed of polyurethane foam which may obtain an insulating effect.

In a preferable embodiment of the present invention, the polyurethane foam sheet 100 may be formed by foaming polyol and isocyanate at a low pressure and a liquid ratio of 100/150 to 180 (polyol/isocyanate). At this time, in reactivity according to a foaming process, a cream time (CT) is 60 to 80 seconds, a rise time (RT) is 270 to 300 seconds, and a demolding time (DT) is 30 to 50 minutes. Here, the polyurethane foam sheet 100 has a density of 20 to 35 kg/m$^3$ and a thickness of 7 to 10 t.

Figure 3B:
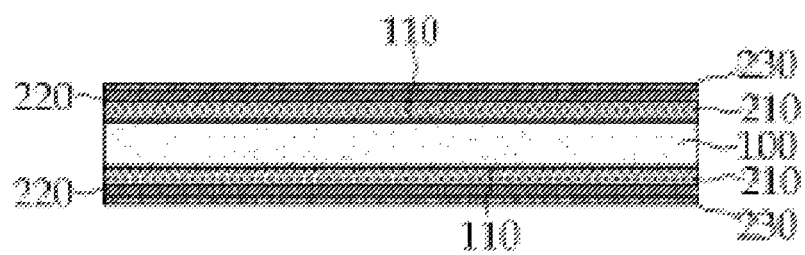

As illustrated in FIG. 3B, a second operation is an operation in which a material having a heat shielding function is laminated on at least one surface, preferably both surfaces of the polyurethane foam sheet 100. FIG. 3B illustrates a state in which a glass mat 210, a hot melt film 220 and a non-woven fabric 230 are stacked in turn and laminated on the both surfaces.

At this time, the glass mat 210 and the non-woven fabric 230 may be manufactured by a general technique to complement strength of a headlining according to the present invention and also to remove moisture.

Meanwhile, the hot melt film 220 serves to substantially shield heat transferred to an inside of a vehicle through a roof panel. The hot melt film 220 may be manufactured by coating a heat shielding material 220a having a thickness of 1 to 20 μm on a film 220b having a multilayered structure including at least one of polyolefin, TPE, EVA, PET and polyamide having a thickness of 30 to 50 μm, and then heat-drying them (see FIG. 3E).

At this time, any material may be used as the heat shielding material, as along as a heat shielding effect is obtained. In the preferable embodiment of the present invention, the heat shielding material may include a modified polyacrylic resin of 5.0 to 10.0 weight %, carbon nanotube of 9.9 to 20.0 weight %, alcohol of 65.0 to 85.0 weight % and an additive of 0.1 to 5.0 weight %.

Also, the carbon nanotube may be variously manufactured to have a single wall or multi-wall structure. However, in the present invention, the carbon nanotube may be multi-wall carbon nanotube having a diameter of 20 to 30 nm and a length of 25 to 35 μm.

The hot melt film 220 has a heat shielding rate of 50 to 90% with respect to an infrared range (800 to 2,200 nm) of sunlight, and this will be described along with performance of the headlining according to the present invention.

Figure 3C:
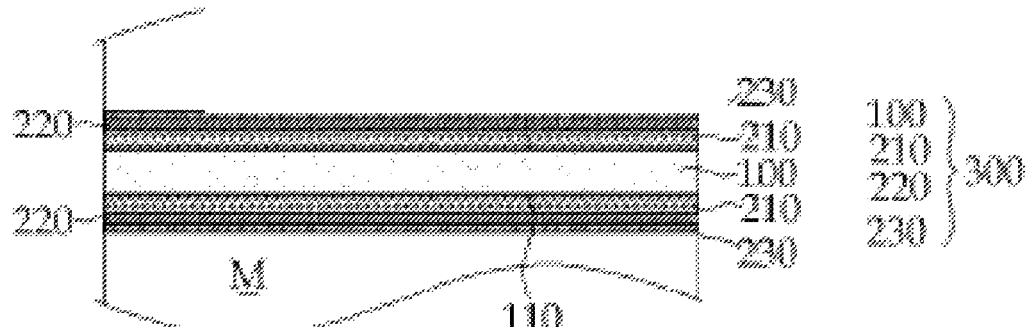

As illustrated in FIG. 3C, a third operation is an operation in which a heat shielding substrate 300 is obtained by thermoforming the laminated polyurethane foam sheet 100.

That is, the heat shielding substrate 300 may be obtained by coating a urethane adhesive 110 on a surface of the polyurethane foam sheet 100, stacking and laminating, in turn, the glass mat 210, the hot melt film 220 and the non-woven fabric 230 thereon, and then thermoforming them. The thermoforming process is performed by pressing them at 130 to 150° C. for 40 to 70 seconds using a thermoforming mold (M) manufactured by a general technique.

Figure 3D:
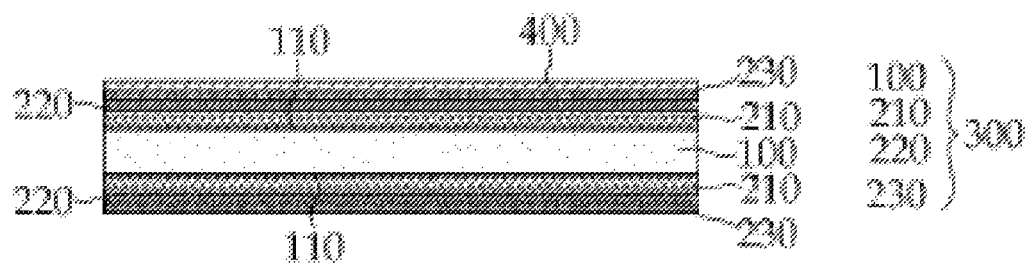
Figure 3E:
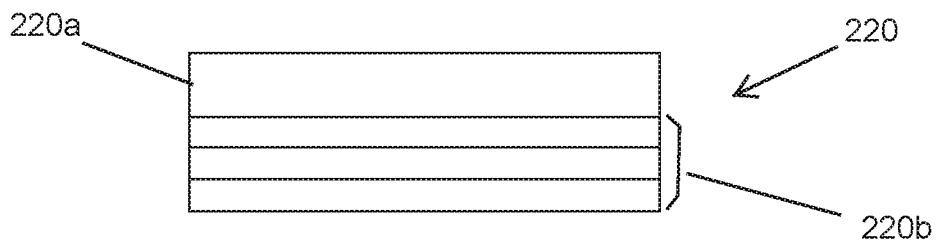

As illustrated in FIG. 3D, a fourth operation is an operation in which an outer material 400 is attached on the heat shielding substrate 300. At this time, the outer material 400 is attached to a surface exposed to the inside of the vehicle. Any material may be used as the outer material 400, as long as it can be used as the outer material 400 in the headlining field. For example, the outer material 400 according to the present invention may be non-woven fabric, suede or cloth.

According to the present invention as described above, the heat transferred to the inside of the vehicle through the roof panel may be shielded by the polyurethane foam sheet having the excellent heat shielding effect, the hot melt film and the carbon nanotube as the heat shielding material, and thus an increase in an internal temperature of the vehicle can be prevented.

In particular, since the present invention prevents the increase in the internal temperature of the vehicle, an operation time of the air conditioner can be correspondingly reduced, and thus fuel efficiency of the vehicle can be increased.

(Headlining)

The present invention includes a headlining manufactured by the above-described manufacturing method. The headlining according to the present invention has a higher heat shielding effect than the conventional headlining, and thus the internal temperature of the vehicle can be further reduced.

[Heat Shielding Performance Test of Headlining]

Figure 4:
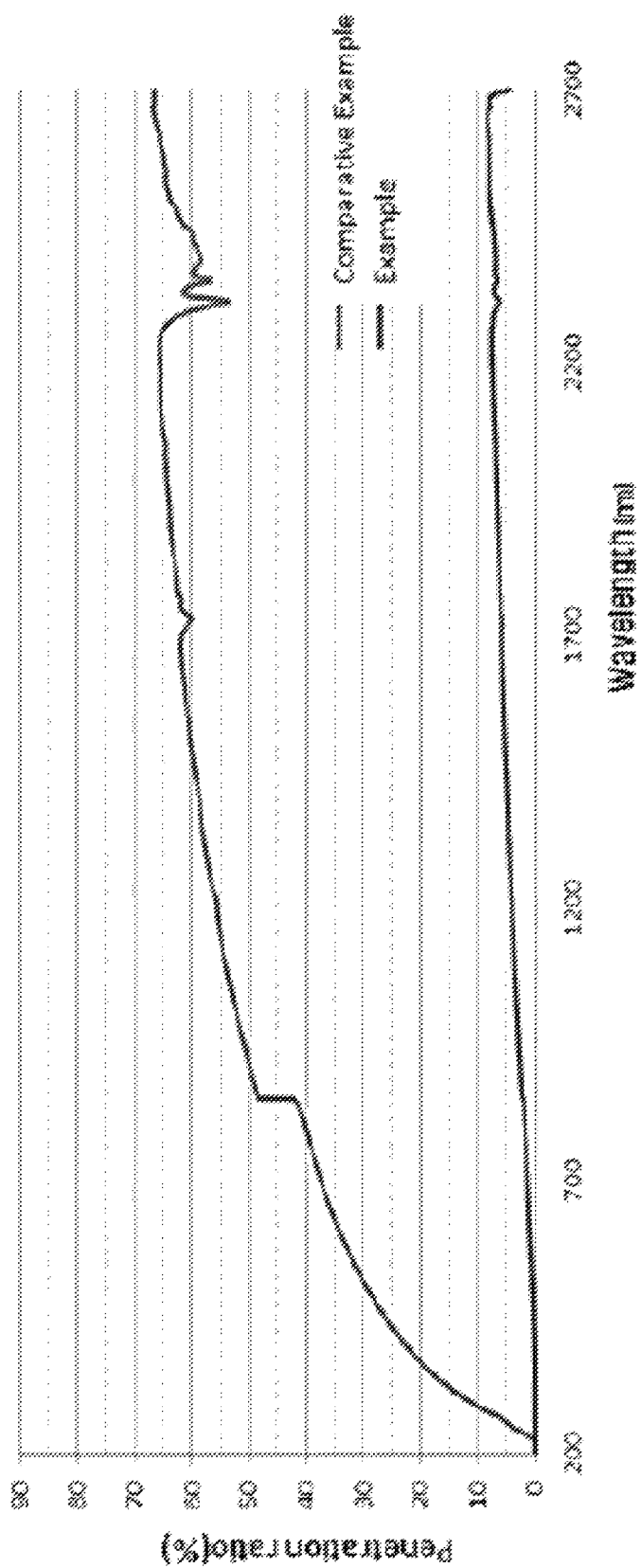
FIG. 4 is a graph comparing heat shielding performance between the headlining (Example) having an additional heat shielding function according to the present invention and a conventional headlining.

FIG. 4 illustrates a result which compares the heat shielding performances between the headlining (Example) manufactured according to the present invention and a conventional headlining which has the same structure as Example but does not have the hot melt film. In FIG. 4, a horizontal axis indicates a wavelength (nm), a longitudinal axis indicates a penetration ratio (%), a red line indicates a penetration curve of Example, and a blue line indicates a penetration curve of Comparative Example. Also, the penetration ratio is measured at a range of 200 to 2,700 nm using a measuring apparatus (JASCO V-670).

As illustrated in FIG. 4, it may be understood that Example has a penetration ratio of 10% or less over the entire measured range, i.e., shields the heat of 90% or more, and Comparative Example has a penetration ratio of 70%, i.e., shields the heat of 30%.

As described above, since the present invention shields the sunlight of 90% or more using the hot melt film and the carbon nanotube, the internal temperature of the vehicle may be reduced as follows.

[Performance Comparison in Real Vehicle]

Figure 5:
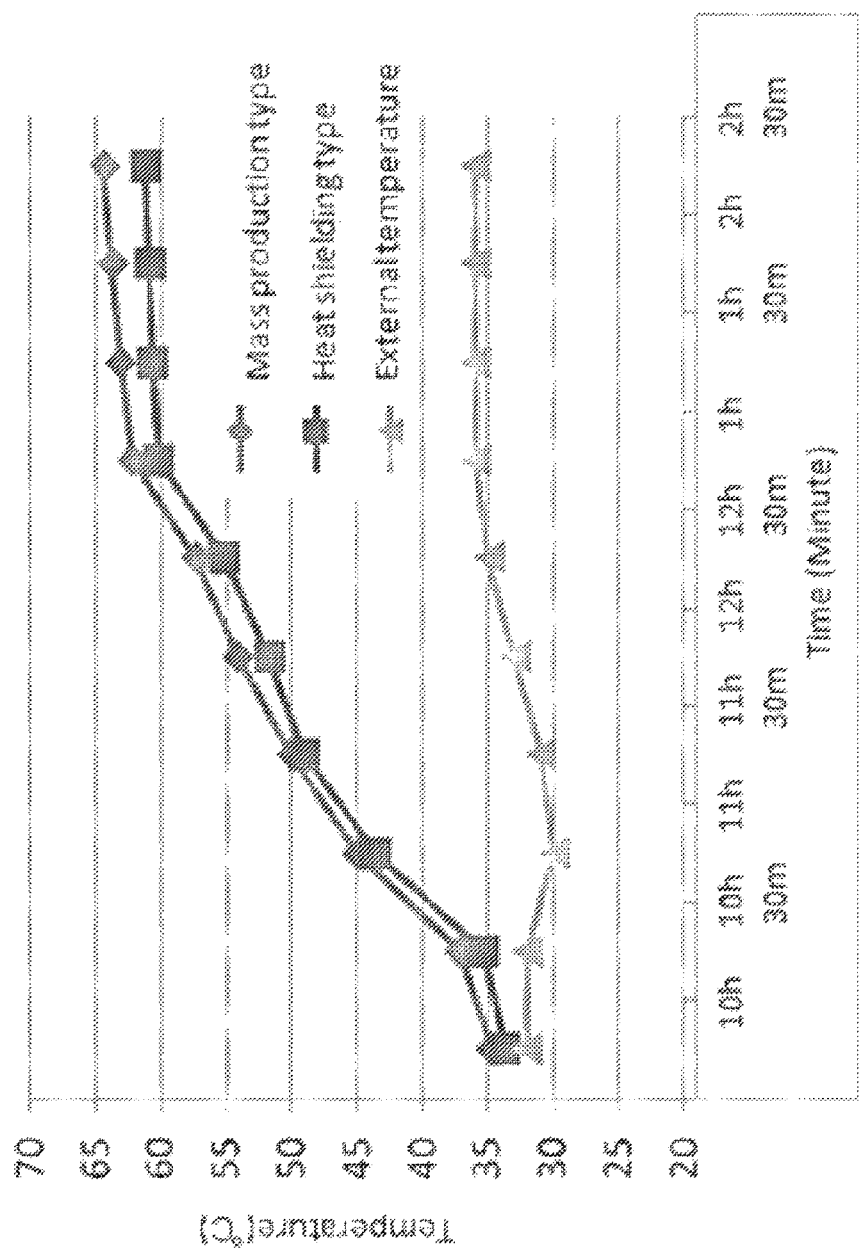
FIG. 5 is a graph illustrating a change in temperature when the headlining (Example) having the additional heat shielding function according to the present invention and the conventional headlining are actually installed at a vehicle.

FIG. 5 illustrates a change in the temperature measured at a side surface of a headlight of a driver seat, when the above-described Example and Comparative Example are installed at a real vehicle. In FIG. 5, a horizontal axis indicates a change in time, a longitudinal axis indicates a change in temperature, a blue line indicates Comparative Example, a brown line indicates Example, and a light green line indicates an external temperature of the vehicle.

In a result which is measured at every 30-minute interval from 10 A.M. to 2:30 P.M. as illustrated in FIG. 5, it may be understood that Example maintained at a lower temperature than Comparative Example, and in particular, a temperature difference (3 to 5° C.) between Example and Comparative Example is gradually increased, as time passes and the external temperature is increased.

As described above, the headlining according to the present invention can shield the heat transferred to the inside of the vehicle, and can reduce the internal temperature compared to the conventional headlining, and thus the fuel efficiency can be correspondingly increased.

The headlining having the heat shielding function for the vehicle and the manufacturing method thereof according to the present invention has the following effects:

(1) Since the headlining has the heat shielding function, the heat transferred into the inside of the vehicle through the roof panel can be shielded, and thus the internal temperature of the vehicle can be reduced by 3 to 5° C. even in the middle of summer.

(2) Therefore, in the summertime when the air conditioner is used much, the air conditioner need not be operated by a difference in the internal temperature, and thus the fuel efficiency of the vehicle can be enhanced.

(3) In particular, since the headlining covers most of an upper portion of the inside of the vehicle, the heat shielding effect can be further increased through the headlining.

(4) Since the hot melt film and the carbon nanotube as the heat shielding material are used to shield the heat, the increase in the weight thereof can be minimized, and also the heat shielding effect can be increased, compared with the increase in the weight of the vehicle.

(5) Since the headlining is arranged under the roof panel to cover most of the roof panel, the heat can be prevented from being transferred to the inside the vehicle over the entire roof panel.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A headlining having a heat shielding function for a vehicle comprising:

a hard polyurethane foam sheet;

a laminated assembly including, in turn, a glass mat, a hot melt film and a non-woven fabric stacked on at least one surface of the polyurethane foam sheet, wherein the hot melt film comprises a heat shielding material coated on a multilayered film, wherein laminated assembly and the polyurethane foam sheet are thermoformed to define a heat shielding substrate that includes the polyurethane foam sheet, the glass mat, the hot melt film and the non-woven fabric; and an outer material disposed on a surface of the heat shielding substrate adjacent the non-woven fabric.

2. A headlining according to claim 1, wherein the polyurethane foam sheet comprises foamed polyol and isocyanate at a low pressure and a liquid ratio of 100/150 to 180 (polyol/isocyanate), and reactivity thereof has a cream time (CT) of 60 to 80 seconds, a rise time (RT) of 270 to 300 seconds, and a demolding time (DT) of 30 to 50 minutes.

3. A headlining according to claim 2, wherein the polyurethane foam sheet has a density of 20 to 35 kg/m$^3$ and a thickness of 7 to 10 t.

4. A headlining according to claim 1, wherein the hot melt film comprises the heat shielding material with a thickness of 1 to 20 μm coated on the multilayered film including at least one of polyolefin, TPE, EVA, PET and polyamide having a thickness of 30 to 50 μm, the heat shielding material and the multilayered film then being heat-dried, and wherein the hot melt film has a heat shielding rate of 50 to 90% with respect to a sunlight infrared range of 800 to 2,200 nm.

5. A headlining according to claim 4, wherein the heat shielding material comprises a composition including a modified polyacrylic resin of 5.0 to 10.0 weight %, carbon nanotube of 9.9 to 20.0 weight %, alcohol of 65.0 to 85.0 weight % and an additive of 0.1 to 5.0 weight %.

6. A headlining according to claim 5, wherein the carbon nanotube is multi-wall carbon nanotube having a diameter of 20 to 30 nm and a length of 25 to 35 μm.

7. A headlining according to claim 1, wherein the outer material is formed of non-woven fabric, suede or cloth.

* * * * *